United States Patent [19]

Word

[11] Patent Number: 4,664,446
[45] Date of Patent: May 12, 1987

[54] BULK MATERIAL HAULING SYSTEM

[76] Inventor: Tim D. Word, 2314 Camelback, San Antonio, Tex. 78209

[21] Appl. No.: 524,291

[22] Filed: Aug. 17, 1983

[51] Int. Cl.$^4$ ............................................. B60P 1/56
[52] U.S. Cl. ................................... 298/8 H; 298/8 T; 298/29
[58] Field of Search ............... 298/8 H, 8 T, 8 R, 27, 298/29, 30, 31, 32

[56] References Cited

U.S. PATENT DOCUMENTS

| | | | |
|---|---|---|---|
| 952,169 | 3/1910 | Young | 298/29 |
| 2,620,226 | 12/1952 | Jones | 298/27 |
| 2,821,433 | 1/1958 | Hamlet | 298/8 T |
| 3,193,330 | 7/1965 | Hribar, Jr. | 298/8 R |
| 3,249,169 | 5/1966 | Cheak | 180/11 |
| 3,610,485 | 10/1971 | Van Raden | 298/8 H |
| 4,119,328 | 10/1978 | Rhodes | 280/415 |
| 4,323,279 | 4/1982 | Domes et al. | 298/23 DF |
| 4,358,238 | 11/1982 | Ely | 414/387 |

Primary Examiner—Frank E. Werner
Assistant Examiner—Janice Krizek
Attorney, Agent, or Firm—Hubbard, Thurman, Turner & Tucker

[57] ABSTRACT

A bulk material hauling tractor and trailer unit comprises a truck tractor having a bottom dump hopper mounted on its chassis. The tractor tows a double axle pup trailer by an elongated tongue having a span of at least twice the trailer wheelbase. The trailer has nonsteerable axle assemblies and supports a bottom dump material transport hopper. The tractor and trailer hoppers are fabricated of conventional steel plate and structural sections and are formed with a reentrant top wall portion to provide a reduced top opening and increased hopper rigidity. The hoppers present relatively low frontal area and aerodynamic drag characteristics and low center for gravity for exceptional stability for over-the-highway as well as off road hauling.

21 Claims, 8 Drawing Figures

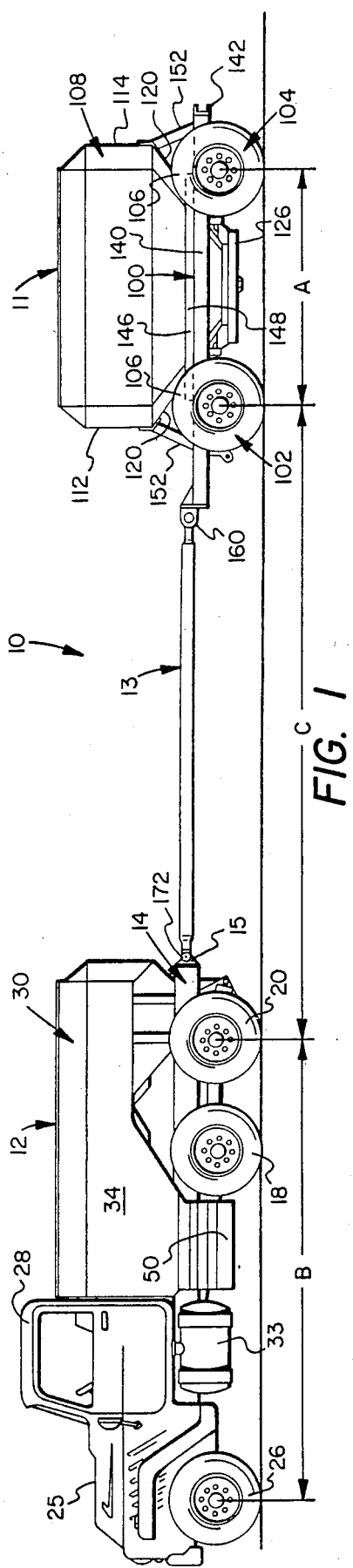
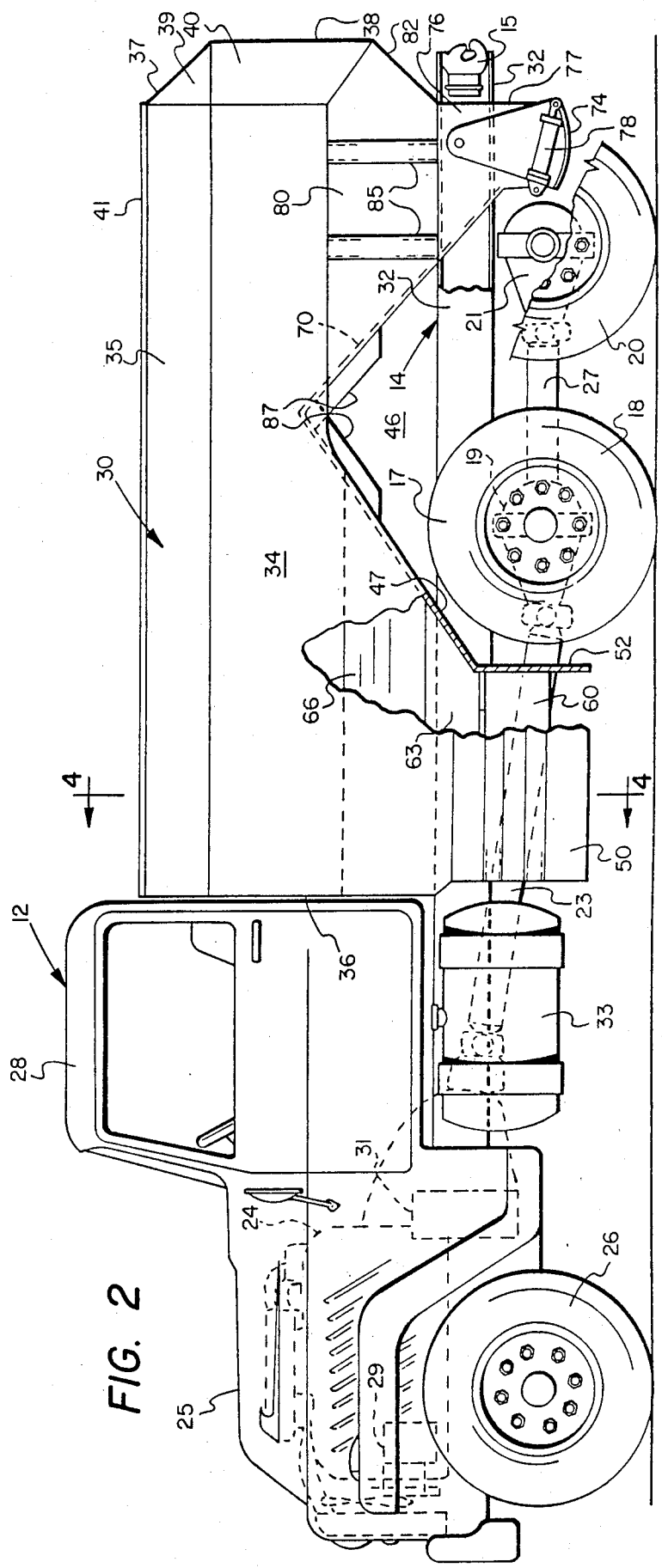
FIG. 1
FIG. 2

BULK MATERIAL HAULING SYSTEM

BACKGROUND OF THE INVENTION

1. Field of the Invention

The present invention pertains to a bulk material hauling tractor and trailer unit including bottom dump hoppers on a truck tractor and a nonsteering "pup" trailer connected to the tractor by an extended tongue to distribute bridge and roadway loading.

2. Background

In the art of truck and trailer units for hauling bulk materials several problems must be overcome in order to provide the most efficient and economical transport of material from one site to another. In the extraction and use of many types of dry bulk materials such as crushed stone, sand, coal and similar commodities, the transportation of the material becomes a significant cost factor. Moreover, the material density presents several problems to the artisan in developing the material transport vehicle. Several types of bulk material hauling vehicles have been developed including tractor and semitrailer vehicle units, combinations of tractor and double axle or wagon type trailer units and separate bulk material beds which may be mounted on conventional single axle or so called twin screw tractors.

In order to maximize vehicle payload the weight of the vehicle must be kept at a minimum while providing adequate structural integrity of the vehicle and the material containing beds or hoppers. Moreover, maximum load limits for roadways and bridges also limit the load concentration on a particular wheelbase or axle which presents a problem to the designer of the truck including tractor-trailer combinations. The synthesis of the several factors which must be considered in developing a bulk material hauling system for over-the-road as well as off road applications presents no obvious choices when taking into consideration the optimization of payload to tare weight, the compliance with roadway and bridge weight limits, and hopper design for desired loading, load containment and unloading features. However, the present invention provides a bulk material hauling system for over-the-road as well as off road use which overcomes several problems in the art.

SUMMARY OF THE INVENTION

The present invention provides for a bulk material hauling system comprising a tractor and trailer unit which maximizes the payload to tare weight relationship, provides for compliance with roadway and bridge weight distribution requirements and reduces operating costs associated with transporting relatively dense bulk materials. In accordance with one aspect of the invention the trailer unit is configured as a nonsteerable but relatively long wheelbase double axle trailer having a frame which is relatively lightweight and uncomplicated. The hauling system is also configured to have an elongated tongue or drawbar interconnecting the tractor and trailer and which is of substantially greater length than the trailer wheelbase to provide for bridge and roadway load distribution requirements and to minimize the turning effort of the nonsteerable trailer.

The present invention also provides a unique truck tractor unit having a bulk material hopper which is configured to optimize material unloading without interfering with the truck structure when unloading over either an unloading pit or for windrow dumping of the hopper load. In this regard, the truck tractor is provided with a uniquely constructed hopper which is mounted directly on the truck chassis or frame to minimize the hopper or bed weight and the hopper is also configured to provide three separate dump doors which are positioned so as to not interfere with dumping material onto the truck undercarriage or chassis and driveline components.

In accordance with yet a further aspect of the present invention there is provided a truck tractor and trailer having bulk material hoppers which are of a configuration to minimize drag or wind resistance, provide for free flow of material for gravity discharge through bottom dump doors on the tractor and trailer hoppers and are configured to minimize load containment problems during over-the-road transport.

The present invention overcomes several problems in the art of bulk material hauling vehicles and includes several unique advantages. The truck and trailer hoppers are configured to minimize wind resistance by presenting a relatively low frontal area and smooth outer sidewalls. The hoppers are constructed with a unique configuration presenting a reduced top opening which increases hopper rigidity without the need for heavy frame or bracing members and minimizes load containment problems during transport. The separate trailer unit is of relatively uncomplicated construction and the nonsteering suspension together with the elongated lightweight tongue or drawbar actually provides improved tracking and steerability in both the trailing mode and when backing the tractor trailer unit. The overall combination provides for improved payload without resorting to the use of high cost materials for hopper and trailer construction, such as aluminum.

Those skilled in the art will recognize the abovedescribed features and advantages of the present invention as well as other superior aspects of the bulk material hauling system upon reading the detailed description which follows in conjunction with the drawings.

BRIEF DESCRIPTION OF THE DRAWINGS

FIG. 1 is a longitudinal side elevation of a bulk material hauling tractor and trailer system in accordance with the present invention;

FIG. 2 is a side elevation partially sectioned of the truck tractor illustrated in FIG. 1 on a larger scale;

DESCRIPTION OF THE PREFERRED EMBODIMENTS

Figure 3:
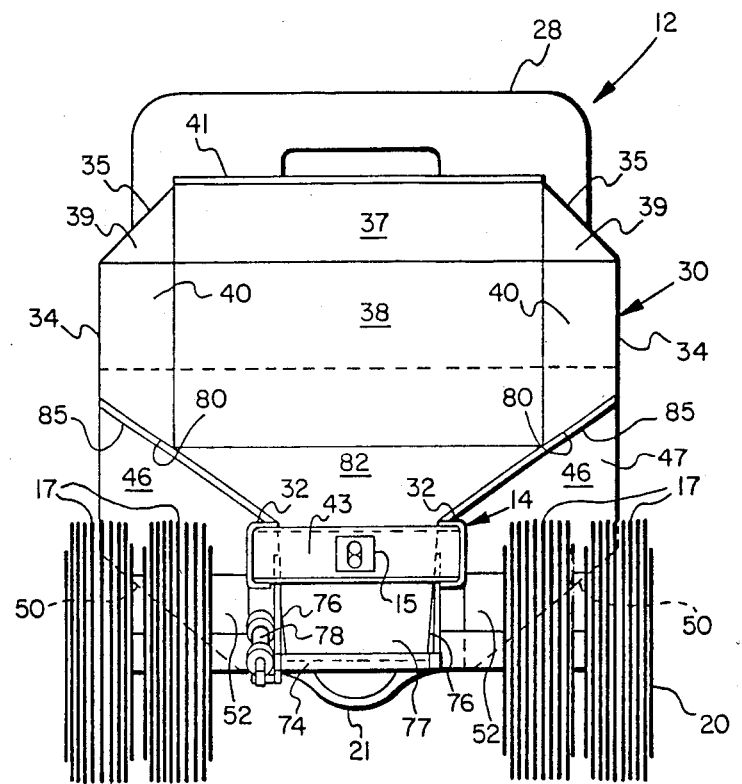
FIG. 3 is a rear end view of the truck tractor unit.

In the description which follows like parts are marked throughout the specification and drawings with the same reference numerals, respectively. Certain features may be illustrated schematically in the interest of clarity and conciseness.

Referring to FIG. 1, there is illustrated a bulk material hauling system, generally designated by the numeral 10, and which includes a fixed axle nonsteering trailer unit 11 connected to a truck tractor 12 by an elongated tongue or drawbar 13. The trailer unit 11 is of a unique configuration which will be described in further detail herein. Moreover, the elongated drawbar or tongue 13 is configured to be of a length substantially greater than the wheelbase of the trailer unit to distribute the tractor trailer loading in compliance with roadway and bridge loading requirements. The tongue 13 is adapted to be connected to a suitable hitch assembly 15 secured to the rear end of the frame of the truck tractor 12. Further details of the tongue 13 will also be described further herein.

Referring now to FIGS. 2 through 5 the inventive features of the tractor 12 will be described. The tractor 12 is of a type comprising a substantially unitary chassis or frame 14 including a rear tandem axle arrangement including spaced apart axle and wheel assemblies 18 and 20. One or both of the axle assemblies 18 and 20 may be adapted to include a conventional axle drive train including a differential housing 19 and 21, respectively. The drive train for the axle assemblies 18 and 20 also includes a propeller shaft 23 running longitudinally of the frame 14 forward to an engine and transmission unit 24 mounted under a forward hood 25. A connecting propeller shaft section 27 extends between the differential or axle drive gear housings 19 and 21 in accordance with typical so called twin screw drive axle arrangements. The truck tractor 12 also includes a front steering axle assembly 26 of conventional design and a driver's cab 28. The tractor 12 also preferably includes an onboard air compressor 29 suitably driven by the engine 24 and adapted to supply compressed air to a reservoir 31 for use with the truck brake system and in conjunction with material unloading means to be described in further detail herein. Conventional saddle type fuel tanks 33, one shown, are mounted on the frame 14 below the cab 28. The truck tractor 12 is of a type generally known in the art of heavy duty trucks adaptable for hauling bulk materials and other commodities and in itself forms no part of the present invention.

Figure 4:
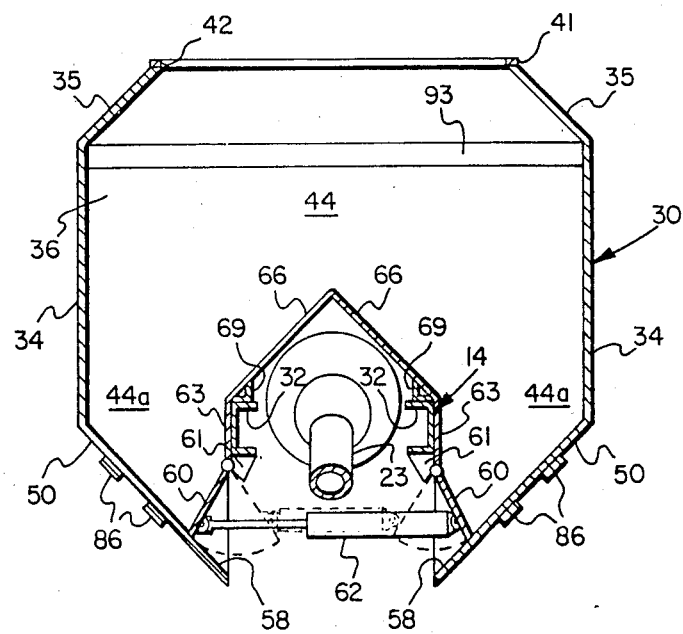
FIG. 4 is a section view taken along the line 4—4 of FIG. 2.
Figure 5:
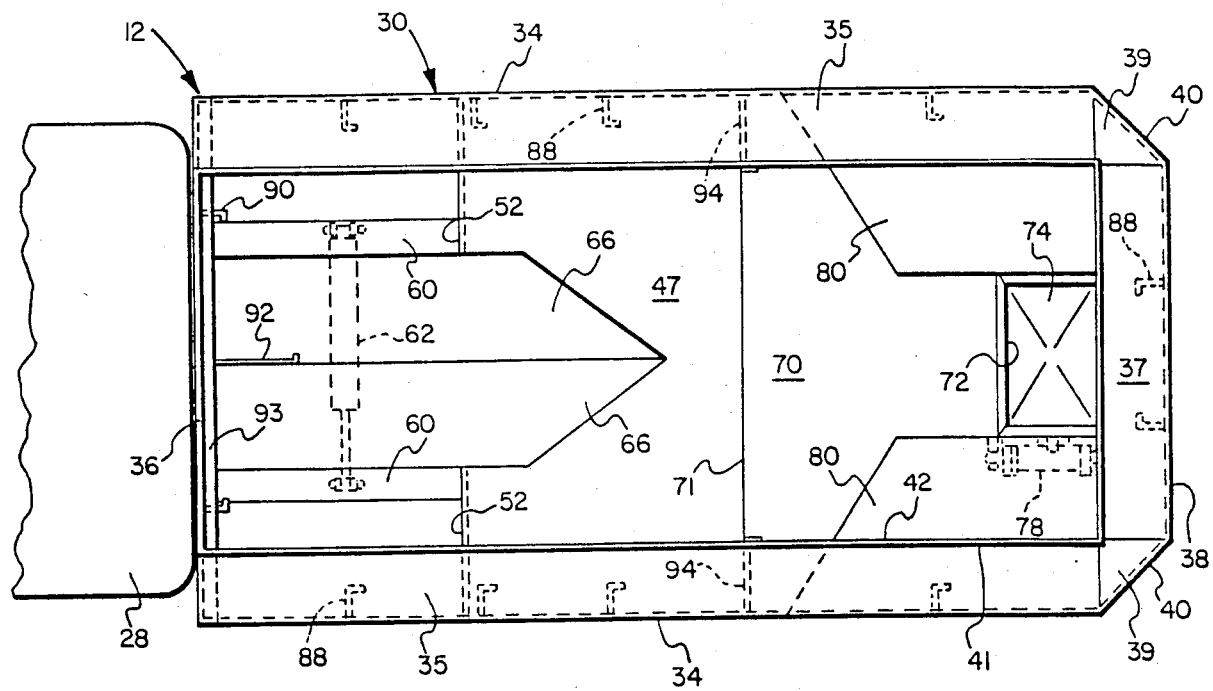
FIG. 5 is a plan view primarly of the tractor hopper.

The truck 12 includes a unique bulk material body or hopper unit, generally designated by the numeral 30. Referring also to FIGS. 3, 4 and 5, the hopper 30 is preferably fabricated as a unit which may be mounted directly on the frame 14, which frame comprises a pair of longitudinally extending spaced apart frame rails 32, see FIGS. 3 and 4, in particular, comprising generally C-shaped or channel type structural steel members. The frame rails 32 are suitably interconnected by structural frame members including an end transverse member 43, FIG. 3, on which the hitch 15 is mounted. The hopper 30 includes opposed longitudinal sidewalls 34 which extend substantially from a forward end wall 36 to a rear end wall 38 and are interconnected to the rear wall by relatively short angled corner walls 40. The sidewalls 34, the rear wall 38, and the corner walls 40 are all provided with inwardly sloping or reentrant upper edge portions 35, 37, and 39, respectively. The upper edges of the front wall 36 and the reentrant wall portions 35, 37 and 39 are delimited by a coaming 41 forming an opening 42 into the hopper interior chamber 44. The lower sides of the sidewalls 34 also extend from the forward end wall 36 to a wheel well 46 for the opposed dual wheel assemblies 17 of the respective axle assemblies 18 and 20. The lower longitudinal edges of the sidewalls 34 then extend rearwardly at a higher elevation, as indicated in FIGS. 2 and 3, to the rear corner walls. The hopper unit 30 is further characterized by sloping lower outer sidewalls 50 contiguous with the lower edges of the sidewalls 34 and extending generally from the front end wall 36 to opposed intermediate transverse end walls 52 which are contiguous with a slope sheet 47 defining, in part, the wheel wells 46.

Referring particularly to FIG. 4, the lower sidewalls 50 extend to and delimit opposed hopper dump openings 58 which are closed by movable hopper doors 60 interconnected by a floating pneumatic cylinder and piston actuator 62. The actuator 62 is a conventional double acting pneumatic cylinder assembly which is suitably connected to the pressure air reservoir 31 by way of a reversible control valve, not shown, wherein the doors 60 may be swung from their closed positions illustrated in the solid lines of FIG. 4 to an open dumping position indicated by the dashed lines in FIG. 4, respectively. The actuator 62 may also be spring biased in the position to hold the doors 60 closed. The doors 60 are engageable with suitable stops 61 to limit their open positions so that both doors will be opened by the floating cylinder actuator 62 if one or the other of the doors tends to stick in the closed position.

Opposed lower hopper interior portions 44a, defined in part by the doors 60, are also delimited by longitudinal vertical wall sections 63 which extend from the forward end wall 36 to the slope sheet 47. The hopper unit 30 is further charcterized by opposed longitudinal bottom slope sheets 66 which also extend from the forward end wall 36 to intersect the slope sheet 47. The lower outer sides of the slope sheets 66 are secured to opposed angle sections 69, FIG. 4, which extend longitudinally of the somewhat tent shaped tunnel formed by the opposed slope sheets and provide means for supporting the hopper unit on the frame rails 32.

Referring to FIG. 5, the slope sheet 47 intersects a second slope sheet 70 along a transverse intersection line 71. The slope sheet 70 extends rearwardly and downwardly to a central bottom dump opening 72. The opening 72 is operable to be covered by a clamshell door 74 pivotally supported on the hopper unit 30 between opposed sidewall portions 76 of a discharge chute 77, disposed between the frame rails 32, FIG. 3. The hopper door 74 is adapted to be moved between open and closed positions by a pneumatic cylinder type actuator 78, FIGS. 2 and 3, which is also adapted to be in communication with the compressed air reservoir 31 by a suitable reversible control valve, not shown.

The rear portion of the hopper unit 30 also includes opposed downwardly sloping sidewall portions 80 which, respectively, extend toward the rear end wall 38 from the slope sheet 70 and are also joined to a lower sloping end wall portion 82 and to the corner sidewall portions 40. The sloping sidewalls 80 are reinforced by spaced apart structural channel members 85 suitably secured to the sidewall portions such as by welding. The lower ends of the members 85 are adapted to support the rear end of the hopper unit 30 on the upper flanges of the opposed frame rails 32 as indicated in FIGS. 2 and 3. The hopper unit 30 may be suitably reinforced by additional structural members such as channel sections 86 extending along the lower sidewalls 50, as shown in FIGS. 2 and 4, by channel sections 87 welded to the undersides of the slope sheets 47 and 70, FIG. 2, and by several interior angle sections 88, 90, 92 and 94, as shown in FIG. 5. One or more channel sections 93 extend across the frontwall 36, as shown in FIGS. 4 and 5. These members are suitably welded to the inner side and end walls of the hopper unit, respectively, as shown and are operable to stiffen the hopper walls.

As will be appreciated from viewing FIGS. 1, 3 and 5, in particular, the hopper unit 30 has a profile which does not increase the aerodynamic drag on the tractor 12 since the profile of the hopper extends vertically to a point below the roof of the cab 28 and the outer sidewalls 34 do not extend substantially beyond the sidewalls of the cab. The walls of the hopper unit 30 are provided with smooth outer surfaces. Importantly, the configuration of the hopper unit 30, which provides the forward longitudinally extending lower hopper portions 44a in communication with the openings 58, and the rear hopper portion which is adapted to dump through the rear opening 72, is such that material dumped from the hopper through the openings 58 and 72 is deposited on the ground surface between the tires 17 of the axle assemblies 18 and 20 but below the frame rails 32 and rearwardly of the differential housings, in the case of the opening 72. Moreover, the arrangement of the doors 60 provides for dumping material out of the hopper 30 forward of the axle assemblies 18 and 20 and on both sides of the axle propeller shaft 23 without inteference therewith. Accordingly, the hopper unit 30 is adapted to accommodate the frame 14 without any modifications thereto so that the hopper unit may be used in conjunction with standard tractors. The hopper unit 30 is also adapted to dump bulk material in such a way that the material may be windrowed on a road surface or the like while the tractor is under way or the tractor may be parked over a pit for receiving material directly from the hopper unit.

The hopper unit 30 may be constructed of conventional structural steel plate and standard structural steel shapes such as angle and channel sections, as indicated in the drawing figures, all suitably welded together into a unitized structure. The reentrant top edge wall portions 35, 37 and 39 also add to the rigidity of the hopper unit 30, reduce material loss from uncovered loads and facilitate installation of a tarpaulin for covering the opening 42. Moreover, the doors 60 and 74 are conveniently actuated between open and closed positions utilizing tractor onboard pressure air for operating the cylinder actuators 62 and 78.

Figure 6:
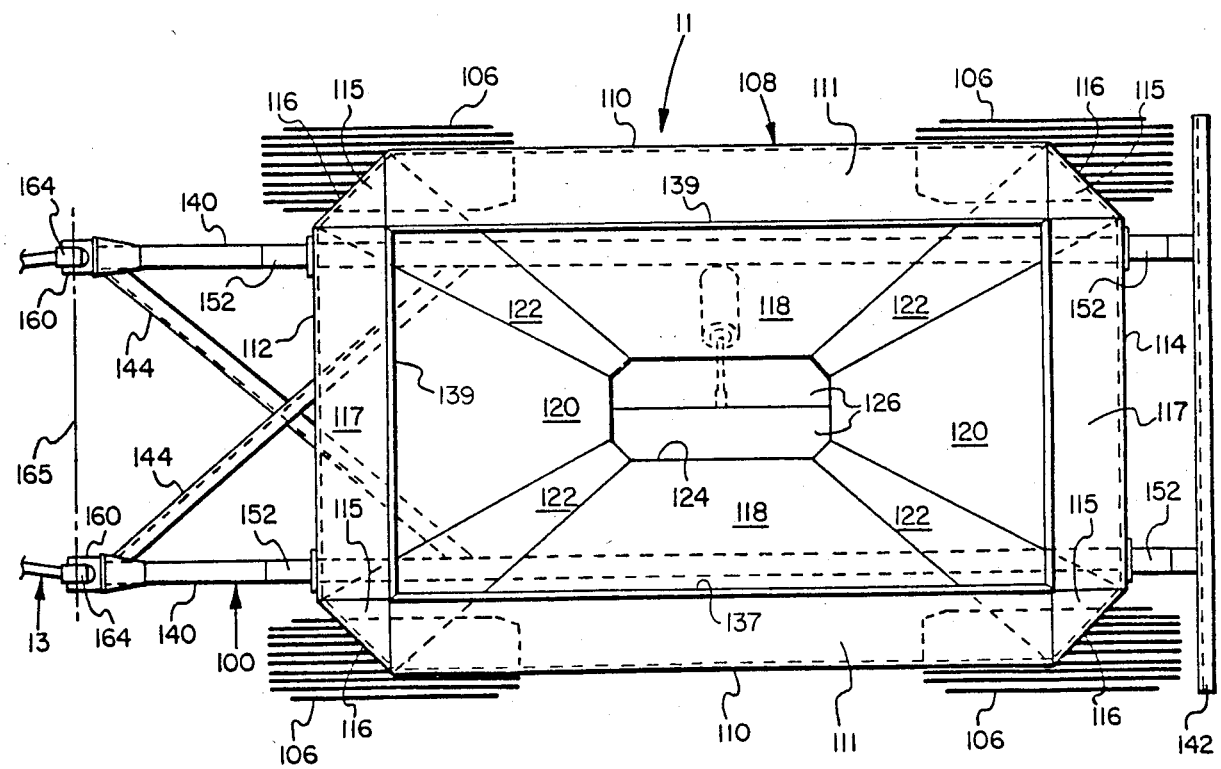
FIG. 6 is a top plan view of the trailer unit.
Figure 7:
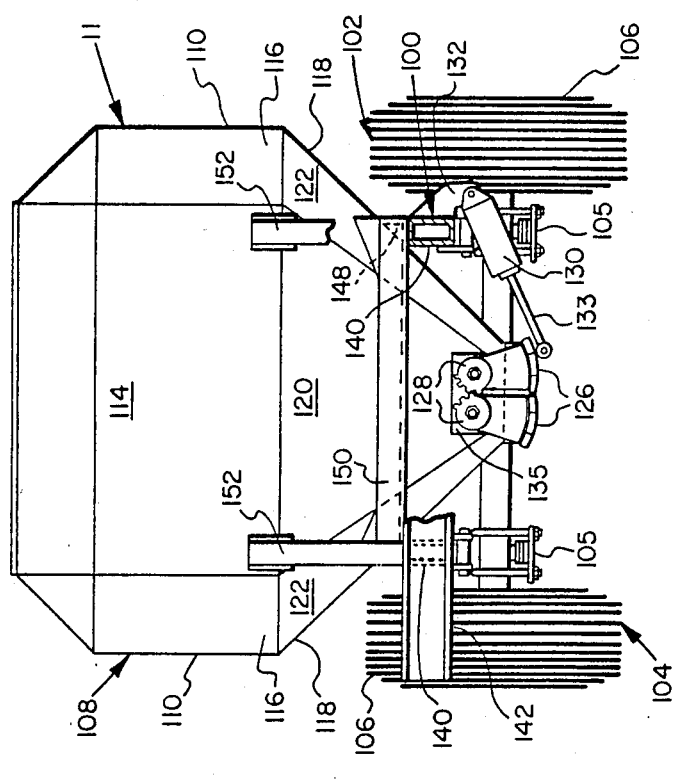
FIG. 7 is a rear end view of the trailer unit.

Referring now to FIGS. 1, 6 and 7, the trailer unit 11 is characterized by a chassis or frame 100 and spaced apart axle assemblies 102 and 104 each secured to the frame in a suitable manner by conventional opposed leaf spring and shackle assemblies 105. In FIG. 6, the right side of the rear axle assembly 104 is broken away to show further strucutre. The axle assemblies 102 and 104 are nonsteerable and are spaced apart to provide a wheelbase in a preferred embodiment of the trailer 11 of approximately nine feet. The axle assemblies 102 and 104 each have two spaced apart wheels 106 including single heavy duty pneumatic rubber tires.

The frame 100 is adapted to support a bulk material hopper 108 of a somewhat rectangular configuration including opposed vertical sidewalls 110 and transverse end walls 112 and 114 which are interconnected to the sidewalls by intermediate corner wall portions 116. The hopper 108 also comprises respective slope sheets 118, 120 and 122 which are integrally joined with the respective vertical wall portions 110, 112–114 and 116 and are secured to each other to form an integral hopper unit. The slope sheets 118, 120 and 122 converge toward a bottom dump opening 124 which, as shown in FIG. 7, is adapted to be closed by a pair of adjacent clamshell doors 126. The angled corner walls 116 and slope sheets 122 improve material flow characteristics during material discharge or dumping operations. The doors 126 are pivotally mounted on the hopper unit 11 and are provided with cooperating intermeshing gear segments 128 which operate to rotate the doors 126 toward and away from each other in unison. As shown in FIG. 7, one of the doors 126 is suitably connected to a pneumatic cylinder actuator 130 mounted on the frame 100 by a bracket 132. The piston rod 133 of the actuator 130 is connected at its distal end to one of the doors 126. The doors 126 are pivotally supported at their opposite ends on spaced apart brackets 135, one shown in FIG. 7, supported on the opposed slope sheets 120.

The frame 100 is characterized by two longitudinal spaced apart frame rails 140 which are preferably formed of rectangular steel tube or box beam sections interconnected by a transverse channel member 142, FIG. 6, at the rear of the trailer and by channel section cross braces 144 at the front of the trailer. The cross braces 144 are provided to stiffen the frame 100 to withstand the tendency to deflect the frame laterally when the trailer is subject to a turning action. The hopper 108 is suitably supported on the frame 100 by a rectangular perimeter subframe 146 made up of interconnected channel members 148 and 150. The hopper 108 is also braced fore and aft by spaced apart depending channel section braces 152 extending between the front and rear hopper walls and the frame rails 140, respectively.

The hopper 108 includes a top opening 137 delimited by a vertically extending coaming 139 disposed around the perimeter of the opening. The upper sidewalls, corner walls and end walls of the hopper 108 are formed with respective reentrant portions 111, 115 and 117 contiguous with each other to increase the rigiditiy of the hopper, reduce the aerodynamic drag on the trailer unit and to minimize entrainment of material in the hopper into the air flowing over the opening 137. The coaming 139 and the reentrant upper wall portions provide for easy application of a removable cover such as a tarpaulin or the like, not shown, to be tightly lashed down over the opening 137.

Figure 8:
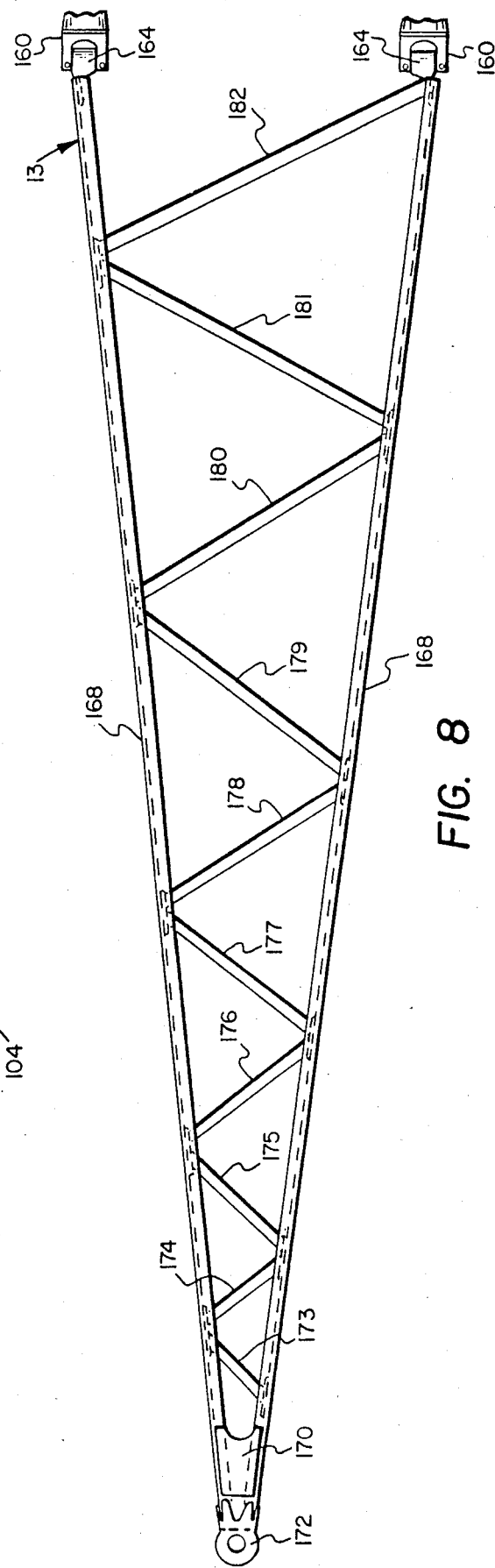
FIG. 8 is a plane view of the trailer tongue.

Referring now to FIGS. 6 and 8, the tongue 13 is connected to the forward end of the trailer frame 100 by spaced apart clevises 160 suitably secured to the respective frame rails 140. The tongue 13 includes opposed bosses 164 which are pivotally supported by the clevises 160 about a horizontal pivot axis 165, FIG. 6. As shown in FIG. 8, the tongue 13 comprises an elongated somewhat triangular shaped truss structure comprising opposed structural channel shaped stringer members 168 which converge toward each other at the forward end of the tongue and are secured by opposed gusset plates 170, one shown, to a towing eye 172 adapted to be connected to the hitch 15. The stringers 168 are also interconnected by tubular steel bracing 173 through 182 to form a lightweight but substantially rigid member which is substantially resistant to deflection in a horizontal plane.

The tare weight of the trailer 11 and the tongue 13 is minimized by the construction described hereinabove. The trailer 11, including the frame 100 and the hopper unit 108, is of uncomplicated construction utilizing conventional steel plate and structural shapes. By eliminating steering gear on the trailer 11 the tare weight is further reduced. The truss type drawbar or tongue 13 also exhibits a high strength to weight ratio under the loading normally applied to the tongue. Moreover, it has been determined in accordance with the present invention that the provision of a drawbar or tongue length between the axis of the trailer forward axle assembly 102 and the tractor rear axle assembly 20 in the range of at least twice the wheelbase of the trailer unit 11, and with a trailer wheelbase of at least 50% of the maximum tractor wheelbase that the trailer may be towed over-the-road and turned on conventional roadways while maintaining good tracking characteristics even though the trailer is nonsteering. Accordingly, referring to FIG. 1, it has been discovered that a nonsteering trailer with a wheelbase A in the range of 60% to 70% of tractor wheelbase B may be suitably towed over-the-road if a span C is maintained in the range of 2.0 to 2.5 times wheelbase A. In a preferred arrangement of a truck tractor trailer unit as illustrated in FIG. 1 and described in detail herein a tandem axle tractor having a wheelbase B of 13.1 ft. fitted with the hopper 30 and a trailer 11 having a wheel base of 9.0 ft. and fitted with a hopper 108 is capable of a payload in the range of 28.5 to 29.5 tons evenly distributed between the hoppers 30 and 108. The length of the tongue 13 from the towing eye 172 to the pivot axis 165 is in the range of 15.0 ft. to 17.0 ft. and the distance between the pivot axis 165 and the axis of the axle assembly 102 is preferably 4.0 ft. for a trailer wheelbase of 9.0 ft. The span C is preferably in the range of 22 to 24 ft.

The overall combination of the truck tractor and trailer unit described above is believed to provide a superior material hauling system having a number of unique features which together produce a somewhat synergistic effect to increase the efficiency of hauling bulk material. In regard to the tractor 12, the configuration of the hopper unit 30, formed of steel plate sections and conventional structural sections suitably welded together, is unique and utilizes the truck frame 14 for direct support thereby eliminating a subframe for the hopper unit. The configuration of the bottom dump openings in the hopper 30 provides for dumping through a drive over type receiving pit or permits dumping on the road surface between the truck tires to windrow the load by moving the truck slowly during the dumping operation. The particular configuration of the bottom dump doors for the hopper units 30 and 108 is unique, although other door configurations can be used with the novel hopper structure.

The overall construction of the trailer 11 including the hopper 180 provides the same advantages as the hopper 30. Moreover, the spread between the axle assemblies 102 and 104, together with the nonsteering axles, permits easy backing of the tractor trailer unit and the span relationship described above permits easy turning of the trailer without requiring a steerable axle assembly. Both the truck tractor and the trailer are provided with a low center of gravity and low aerodynamic drag for increased stability and reduced fuel consumption. As previously stated, the configuration of the reentrant top edges of the hoppers 30 and 108 also increases the rigidity of the hoppers, reduces entrainment of material stored in the hoppers during transport at highway speeds into the air stream flowing over the top of the hoppers and also provides for easy covering of the top openings with a removable cover.

Those skilled in the art will appreciate the features of the truck tractor and trailer unit of the present invention and will recognize that various substitutions and modifications may be made to the specific embodiments described herein without departing from the scope and spirit of the invention as recited in the appended claims.

What I claim is:

1. A bulk material hopper unit for a truck tractor having a self propelled chassis including a front steering wheel and axle assembly and a rear propulsion wheel and axle assembly, each of said axle assemblies including opposed wheels supporting an elongated frame, said frame including a pair of spaced apart longitudinal frame rails, an engine mounted forwardly on said frame and a drive train including longitudinal prperller shaft means interconnecting said engine and said rear axle assembly, said hopper unit comprising:
  a container directly mounted on said spaced apart frame rails, said container having opposed sidewalls, front and rear end walls, slope sheet means defining a bottom wall and door means in said bottom wall operable for gravity discharge of material from said hopper unit, said door means including opposed doors in said bottom wall extending longitudinally relative to said frame rails forwardly of said rear axle assembly and operable to discharge material from said hopper unit to respective spaces confined between said opposed wheels of said rear axle assembly and on opposite sides of said propeller shaft means between said engine and said rear axle assembly.
2. The hopper unit set forth in claim 1 wherein:
  said container includes inwardly sloping reentrant top edge portions of said respective sidewalls and said end walls integrally joined to form a rigid unitized container and defining a top opening of said hopper unit.
3. The hopper unit set forth in claim 1 wherein:
  said opposed doors are interconnected by a pressure fluid cylinder and piston actuator operable to open both of said opposed doors.
4. The hopper unit set forth in claim 1 wherein:
  said opposed doors are formed in opposed longitudinal portions of said bottom wall of said hopper unit, said opposed longitudinal portions including portions of said slope sheet means extending along and above said propeller shaft.
5. The hopper unit set forth in claim 4 wherein:
  said hopper unit includes opposed longitudinal slope sheets extending downwardly from said opposed sidewalls toward said opposed doors, respectively.
6. The hopper unit set forth in claim 1 wherein:
  said door means includes a door in said bottom wall means between said frame rails and rearward of said tractor rear axle assembly.
7. The hopper unit set forth in claim 6 wherein:
  said slope sheet means includes opposed transverse slope sheets extending away from each other downwardly in opposite directions toward said doors and bridging over said rear axle assembly.
8. A bulk material hauling system comprising a truck tractor and a trailer adapted for high efficiency over-the-road transport and for load distribution between said tractor and said trailer for compliance with roadway and bridge maximum load limits:
  said tractor including a self propelled chassis including a front steering tractor wheel and axle assembly and a rear propulsion tractor wheel and axle assembly supporting a frame, an engine and driver's cab mounted on said frame, a drive train interconnecting said engine and said rear tractor axle assembly, and a material receiving hopper unit adapted for mounting on said tractor frame rearward of said cab;

said tractor hopper unit comprises a unitized metal plate container having opposed sidewalls, front and rear end walls, slope sheet means defining at least a part of a bottom wall and door means in said bottom wall for discharging material from said tractor hopper unit, said container being directly mounted on spaced apart frame rails on said tractor;

said trailer including a frame supprted by spaced apart nonsteerable front and rear trailer wheel and axle assemblies, said trailer frame supporting a material receiving hopper unit having a bottom material discharge opening between said trailer axle assemblies; and an elongated tongue interconnecting said trailer and said tractor, the span of said tongue between said tractor rear axle assembly and said trailer front axle assembly being in the range of 2.0 to 2.5 times the wheelbase of said trailer to provide a load distribution of said system in compliance with said bridge load limits.

9. The hauling system set forth in claim 8 wherein: said container includes inwardly sloping reentrant top edge portions of said respective sidewalls and said end walls integrally joined to form a rigid unitized container and defining a top opening of said tractor hopper unit.

10. The hauling system set forth in claim 8 wherein: said door means includes opposed longitudinally extending doors in a portion of said bottom wall forward of said tractor rear axle assembly and operable to discharge material from said tractor hopper unit between the wheels of said tractor and on opposite sides of propeller shaft means forming a part of said drive train between said engine and said tractor rear axle assembly.

11. The hauling system set forth in claim 10 wherein: said opposed doors are interconnected by a pressure fluid cylinder and piston actuator operable to open both of said opposed doors.

12. The hauling system set forth in claim 11 wherein: said opposed doors are formed in opposed longitudinal portions of said bottom wall of said tractor hopper unit extending below opposed longitudinal portions of said slope sheet means extending along and above said propeller shaft.

13. The hauling system set forth in claim 10 wherein: said tractor hopper unit includes opposed longitudinal slope sheets extending downwardly from said opposed sidewalls toward said opposed doors, respectively.

14. The hauling system set forth in claim 11 wherein: said door means includes a door in said bottom wall means between said frame rails and rearward of said tractor rear axle assembly, and a pressure fluid operated actuator for opening and closing said door rearward of said tractor rear axle assembly.

15. The hauling system set forth in claim 14 wherein: said slope sheet means includes opposed transverse slope sheets contiguous with each other along a transverse ridge line and extending away from each other downwardly in opposite directions toward said doors and bridging over said rear axle assembly.

16. The hauling system set forth in claim 8 wherein: the front end walls and sidewalls of said hopper units have substantially smooth outer surfaces, respectively.

17. The hauling system set forth in claim 8 wherein: said trailer frame includes two spaced apart longitudinal frame rails supported by said trailer axle assemblies, said trailer hopper unit includes a unitized metal plate container including spaced apart longitudinal sidewalls, transverse end walls and slope sheet means extending from said sidewalls and end walls, respectively, toward said bottom opening in said trailer hopper unit, said trailer hopper unit being mounted on and between said trailer frame rails and said trailer axle assemblies and said bottom opening being disposed between opposed wheels of each of said trailer axle assemblies.

18. The hauling system set forth in claim 17 wherein: said trailer hopper unit includes corner wall portions interposed between and contiguous with adjacent ones of said sidewalls and said end walls, respectively, said corner wall portions including slope sheet means extending between adjacent ones of said sidewall and said end wall slope sheet means toward said central bottom opening.

19. The hauling system set forth in claim 17 wherein: said trailer hopper unit includes inwardly sloping top edge portions of said side and end walls, respectively joined to form a rigid unitized container and delimiting a top opening of said trailer hopper unit.

20. The hauling system set forth in claim 17 including: opposed doors closing said bottom opening and operably connected to pressure fluid cylinder and piston actuator means for moving said doors between open and closed positions.

21. A bulk material hauling system comprising a truck tractor and a trailer adapted for high efficiency over-the-road transport and for load distribution between said tractor and said trailer for compliance with roadway and bridge maximum load limits;

said tractor including a self propelled chassis including a front steering tractor wheel and axle assembly and a rear propulsion tractor wheel and axle assembly supporting a frame, an engine and a driver's cab mounted on said frame, a drive train interconnecting said engine and said rear tractor axle assembly, and a material receiving hopper unit adapted for mounting on said tractor frame rearward of said cab;

said tractor hopper unit comprises a unitized metal plate container having opposed sidewalls, front and rear end walls, slope sheet means defining at least part of a bottom wall and door means in said bottom wall for discharging material from said tractor hopper unit, said container being directly mounted on spaced apart frame rails on said tractor;

said trailer including a frame supported by spaced apart nonsteerable front and rear trailer wheel and axle assemblies, said trailer frame supporting a material receiving hopper unit having a bottom material discharge opening between said trailer axle assemblies and;

an elongated tongue connected to said trailer frame forwardly of said trailer front axle assembly, comprising an elongated truss member having longitudinally extending channel members converging from respective spaced apart pivot boss means for connecting said tongue to said trailer frame toward a toeing eye for connecting said tongue to said tractor, and laterally extending brace means interconnecting said channel members and providing a light weight structure which is adapted to accommodate substantial horizontal bending loads on turning said tractor and trailer units during transport movement thereof, said tongue interconnecting said trailer and said tractor, the span of said tongue between said tractor rear axle assembly and said trailer front axle assembly being in the range of 2.0 to 2.5 times the wheel base of said trailer to provide a load distribution of said system in compliance with said bridge load limits.

* * * * *